UNITED STATES PATENT OFFICE.

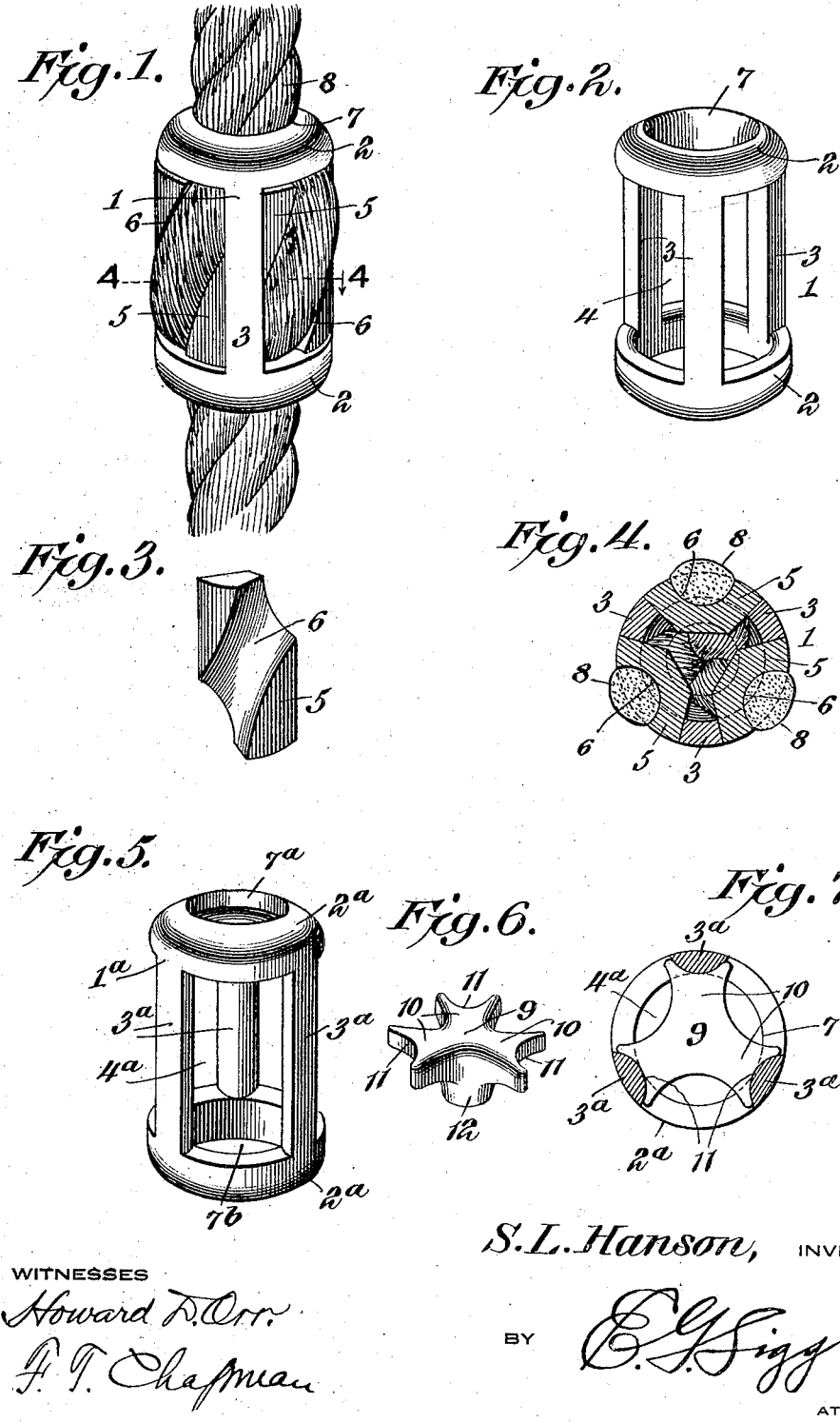

SAMUEL L. HANSON, OF ALBERT LEA, MINNESOTA.

ROPE-CARRIED TRIP DEVICE.

1,299,334.    Specification of Letters Patent.    Patented Apr. 1, 1919.

Application filed October 13, 1917. Serial No. 196,556.

*To all whom it may concern:*

Be it known that I, SAMUEL L. HANSON, a citizen of the United States, residing at Albert Lea, in the county of Freeborn and State of Minnesota, have invented a new and useful Rope-Carried Trip Device, of which the following is a specification.

This invention has reference to rope carried trip devices, and its object is to provide a device attachable to a rope without the necessity of making a knot or producing a bulky lump.

In accordance with the invention there is provided a cage through or into which a rope may be passed, and the rope is held from slipping or otherwise moving within the cage, after being once installed therein, by an impediment lodged in the cage and in the rope within the cage, and having the effect of expanding portions of the rope so as to be, in part, exterior to or reach the exterior portion of the cage.

The invention will be best understood from a consideration of the following detailed description, taken in connection with the accompanying drawings forming a part of this specification, with the further understanding that while the drawings show a practical form of the invention, the latter is not confined to any exact conformity with the showing in the drawings, but may be changed and modified so long as such changes and modifications come within the scope of the appended claims.

In the drawings,

Figure 1 is a perspective view of a trip device applied to a rope, such trip device being designed more particularly for use in connection with hay carriers but susceptible to other uses.

Fig. 2 is a perspective view of the cage shown in Fig. 1 but omitting the rope and blocks provided for spreading the rope within the cage.

Fig. 3 is a perspective view of one of the spreader blocks.

Fig. 4 is a section of the line 4—4 of Fig. 1.

Fig. 5 is a view similar to Fig. 2 of a somewhat different form of cage.

Fig. 6 is a perspective view of the filler block which may be used in connection with the cage of Fig. 5.

Fig. 7 is a cross section of the cage of Fig. 5 taken between the ends of the cage and showing the filler block in plan view in the cage.

Referring to the drawings, there are shown in Figs. 1, 2 and 4 a cage 1, a similar slightly modified form of cage being shown in Figs. 5 and 7 at 1ª.

The cage comprises end members or rings 2 joined by longitudinal bars 3 which, in the showing of the drawings, are three in number and equidistantly disposed. The cage is of approximately cylindrical form and the bars 3 are therefore disposed in 120° relation.

The width of the bars 3, and their spacing is such as to leave openings 4 between them large enough to accommodate blocks 5, one of which is shown separately in Fig. 3. These blocks each constitute a fractional portion of a segment of a cylinder and on the outer face of each block there is produced a groove 6 having a helical twist with relation to the length of the block, which length is about that of an opening 4 measured lengthwise of the cage 1.

The blocks 5 are each of a size to fit into the opening 4, when introduced from the outside thereof, with one end of the block engaging one end of the bar 3 forming one side of the opening 4, and the other end engaging the opposite end of the next adjacent bar 3, marking the other side of the same opening 4. When a block 5 is so placed in the cage, the groove 6 has its opposite ends opening toward corresponding passages 7 through the respective ring ends 2 of the cage.

When the cage is applied to a rope, such as indicated at 8 in Figs. 1 and 4, the cage will slide freely along the rope, being properly proportioned for the purpose. When the cage is used as a stop or latch member in a hay carrier, the cage is made of such size as to readily inclose a rope of the size used in the hay carrier.

Such rope, usually Manila rope, is customarily a three-strand rope, wherefore the cage is formed with three bars 3 and three openings 4, and three blocks 5 are employed in such a cage. Of course, any other arrangement may be employed if a cage is used with a rope of a different number of strands than three, but ordinarily the ropes employed are three-strand ropes and, for the convenience of description, it may be considered that the cage has three openings and three bars.

In order to insert the blocks 5, the portions of the rope 8 projecting beyond the ends of the cage 1 are twisted in a direction to untwist the strands in the cage, wherefore the strands tend to project through the respective openings 4 in the cage.

When a sufficient untwisting action has occurred, the strands may loop out to an appropriate distance through the openings 4, whereupon the blocks 5 are inserted in the loops and the rope is then pulled taut, thus seating the blocks 5 in the spaces 4 against the corresponding bars 3, which latter are of segmental cross section to properly seat the radial sides of the segmental blocks 5. When this occurs the tightened strands stay in the grooves 6 but are unable to approach as closely as at first and project to some extent, which may be but a slight extent, beyond the cage. In fact, it is quite possible to keep the strands within the confines of the contour of the cage. The blocks provide impedimenta preventing the strands within the cage from approaching as closely together as they were originally placed, and since the blocks lock in the cage, the latter becomes firmly fixed to the rope at the point at which it is applied and cannot be moved lengthwise of the rope so long as said rope is under longitudinal strain.

The cage, therefore, constitutes a block or trip or holding device, which, when once placed upon the rope, remains positively in fixed relation thereto and produces an effective enlargement serviceable for the purposes for which it is intended.

The cage $1^a$ is provided with heads or end rings $2^a$, one having a passage $7^a$ therethrough and another having a passage $7^b$ therethrough. The passage $7^a$ is designed to receive a hook or eye, or other suitable device, usually having a rounded or ball end fitting the head $2^a$, but too large to be drawn therethrough. Such hook may constitute a convenient swivel hook, but being of common construction, requires no illustration or special description.

The rope is introduced through the opening $7^b$ into the cage and the strands are opened out and carried through openings $4^a$, between bars $3^a$ corresponding to the openings 4 and bars 3 of the cage 1. The bars $3^a$, instead of being of segmental cross section, have their inner faces rounded.

There is also provided a block 9, best shown in Fig. 6, this block having three arms 10 each with a concave end 11 to fit the curved surface of a corresponding bar $3^a$, and one face of the block 9 is formed with a boss 12, the arms of the block 9 being suitably curved on their adjacent edges.

The block 9 is introduced into the cage $1^a$ so as to rest upon the introduced rope between the spread-out strands and the latter are then carried about the arms 10 of the blocks and are interlaced in such manner that lengthwise pull on the rope only serves to tighten the hold of the strands upon each other, the block preventing these strands from approaching close enough together to pull out through the opening $7^b$.

While the cage $1^a$ with the block 9 may be utilized as a rope fastener for the attachment of one end of the rope to some device, the same block 9, with the end of the rope fastened thereto, may be utilized as a trip or latch device operating in the same manner as the cage 1 when applied to the rope 8.

This application is a continuation in part of application No. 115,007, filed August 15, 1916.

What is claimed is:

1. A device of the character described, comprising a cage with heads and longitudinal circumferentially spaced bars connecting the heads, and means introducible into the cage for spreading the strands of a rope within the cage to thereby prevent the withdrawal of the rope from the cage in a direction lengthwise of the cage.

2. A trip device for ropes comprising a cage having terminal heads with openings therethrough, and connecting bars for the heads spaced apart circumferentially of the cage and spacing the heads, the number of bars being equal to the number of strands in the rope, whereby a rope may be introduced into the cage through a head and the strands of the rope separated and moved individually out of the cage through respective openings between the bars.

3. A device of the character described, comprising a cage having terminal heads with openings therethrough connecting bars for the heads spaced apart circumferentially of the cage and spacing the heads, whereby a rope may be introduced into the cage through a head and the strands of the rope be moved out of the cage through openings between the bars, and means introducible into the cage between the spreadout strands of the rope and the interior of the cage to expand the rope to a greater extent than the opening through the head of the cage through which the rope may be introduced.

4. A device of the character described, comprising a cage with end members and side bars connecting the end members and spaced apart and equal in number to the number of strands composing a rope to which the device is to be applied, whereby the rope may be passed through the cage by way of the heads and within the cage the strands of the rope be spread out and held in the spread condition to form an enlargement incapable of being pulled out through either end of the cage.

5. A device for the purpose described comprising a cage with end members each having a passage therethrough and side bars connecting the end members and spaced apart and corresponding in number to the number of strands composing a rope to be introduced into the cage, and grooved blocks of a size and shape to enter the spaces between the side bars for introduction between the spread strands of a rope passing through the cage.

6. A device for the purpose described comprising a cage with ring-shaped end members and longitudinal side bars connecting the end members and spaced apart and corresponding in number to the number of strands composing the rope, and segmental blocks each with a helically twisted groove on its outer surface and adapted to lodge between the side bars of the cage with the rope when the strands within the cage are expanded.

7. A device for the purpose described comprising a cage with end members and side bars and having lateral openings between the side bars and also openings through the end members of the cage to receive a rope, and spreader means for the rope lodged in the cage and provided with seats for the spread strands of the rope.

8. A device for the purpose described comprising a cage of general cylindrical shape with ring shaped end members and connecting side bars corresponding in number to the number of strands of the rope to which the cage is to be applied, said bars being spaced circumferentially of the cage, and a plurality of blocks of a number corresponding to the number of the strands of the rope, each block being of a size to fit between the connecting bars and having an exterior groove twist with relation to the length of the block to constitute a seat for that portion of a strand of the rope within the cage to hold the rope from entrance into the cage to an extent to move out of the cage through one of the heads thereof.

9. A device for the purpose described comprising a substantially cylindrical cage with ring shaped heads and connecting bars for the heads, said bars being of segmental cross section and equidistant and of a number corresponding to the number of strands of a rope to which the cage is to be applied, and blocks equal in number to the number of strands of the rope, each block being of segmental cross section with a helically arranged exterior groove, the blocks each being of a size to fit between two adjacent connecting bars with the groove seating an expanded strand of that portion of the rope extending through the cage.

In testimony that I claim the foregoing as my own, I have hereto affixed my signature in the presence of two witnesses.

SAMUEL L. HANSON.

Witnesses:
ALFRED CHRISTOPHERSON,
C. A. CHAPMAN.

Copies of this patent may be obtained for five cents each, by addressing the "Commissioner of Patents, Washington, D. C."